United States Patent
Harris et al.

(10) Patent No.: US 10,779,161 B2
(45) Date of Patent: Sep. 15, 2020

(54) DELIVERY OF CELLULAR NETWORK INSIGHTS TO SUBSCRIBER DEVICES THROUGH SSID VIA CELLULAR SYSTEM INFORMATION BLOCK

(71) Applicant: Nokia Solutions and Networks Oy, Espoo (FI)

(72) Inventors: John Harris, Glenview, IL (US); Carsten Ritterhoff, Olching (DE); Maximilian Riegel, Nuremberg (DE)

(73) Assignee: Nokia Solutions and Networks Oy, Espoo (FI)

( * ) Notice: Subject to any disclaimer, the term of this patent is extended or adjusted under 35 U.S.C. 154(b) by 403 days.

(21) Appl. No.: 15/510,584

(22) PCT Filed: Jul. 20, 2015

(86) PCT No.: PCT/US2015/041073
§ 371 (c)(1),
(2) Date: Mar. 10, 2017

(87) PCT Pub. No.: WO2016/043839
PCT Pub. Date: Mar. 24, 2016

(65) Prior Publication Data
US 2017/0257822 A1    Sep. 7, 2017

Related U.S. Application Data

(60) Provisional application No. 62/175,676, filed on Jun. 15, 2015.

(30) Foreign Application Priority Data

Sep. 15, 2014    (WO) ................. PCT/EP2014/069585

(51) Int. Cl.
H04W 12/04 (2009.01)
H04W 48/12 (2009.01)
(Continued)

(52) U.S. Cl.
CPC ......... *H04W 12/0401* (2019.01); *H04L 47/10* (2013.01); *H04W 48/06* (2013.01);
(Continued)

(58) Field of Classification Search
CPC . H04W 48/12; H04W 36/0007; H04W 60/00; H04W 72/005; H04W 76/10;
(Continued)

(56) References Cited

U.S. PATENT DOCUMENTS 6,999,759 B2    2/2006    Harris et al.
7,689,208 B2    3/2010    Harris et al.
(Continued)

FOREIGN PATENT DOCUMENTS

EP    2061192 A1    5/2009
JP    2009094971 A    4/2009
(Continued)

OTHER PUBLICATIONS

Rigney et al., "Remote Authentication Dial in User Service (RADIUS)", Network Working Group, RFC 2865, Jun. 2000, pp. 1-76.
(Continued)

*Primary Examiner* — Nimesh Patel
(74) *Attorney, Agent, or Firm* — Harrington & Smith

(57) ABSTRACT

Network insights may be useful in various communication networks. For example, certain cellular or similar networks may benefit from the delivery of cellular network insights to subscriber devices through service set identifier (SSID). A method can include detecting, by a device, at least one advertised value of non-cellular access, wherein the at least one advertised value is received by the device over a cellular system information block message. The method can also include extracting, from the at least one advertised value, at least one cellular network insight for a cellular network condition.

20 Claims, 7 Drawing Sheets

(51) Int. Cl.
*H04L 12/801* (2013.01)
*H04W 48/06* (2009.01)
*H04W 48/16* (2009.01)
*H04W 48/18* (2009.01)
*H04W 84/12* (2009.01)
*H04W 48/10* (2009.01)

(52) U.S. Cl.
CPC ........... *H04W 48/12* (2013.01); *H04W 48/16* (2013.01); *H04W 48/18* (2013.01); *H04W 84/12* (2013.01); *H04W 48/10* (2013.01)

(58) Field of Classification Search
CPC . H04W 8/205; H04W 48/17; H04W 72/0413; H04W 72/048; H04W 72/042; H04W 36/0085; H04W 36/00835; H04W 36/0094; H04W 36/04; H04W 52/028; H04W 52/243; H04W 52/40; H04W 16/10; H04W 16/16; H04W 36/0072; H04W 36/12; H04W 36/24; H04W 36/30; H04W 4/08; H04W 76/00; H04W 84/18; H04W 4/023; H04W 4/029; H04W 40/246; H04W 8/005; H04W 4/80; H04W 88/08; H04W 4/025; H04W 40/20; H04W 40/244; H04W 4/50; H04W 16/18; H04W 28/06; H04W 4/06; H04W 72/0453; H04W 48/08; H04W 16/32; H04W 84/045; H04W 36/0061; H04W 76/15; H04W 28/08; H04W 28/16; H04W 36/0066; H04W 36/0083; H04W 36/0088; H04W 60/04; H04W 72/04; H04W 84/12; H04W 88/06; H04W 48/18; H04W 36/14; H04W 48/16; H04W 8/08; H04W 16/14; H04W 28/0236; H04W 36/0016; H04W 36/08; H04W 36/22; H04W 40/36; H04W 48/10; H04W 74/0858; H04W 40/04; H04W 72/0426; H04W 72/085; H04W 84/042; H04W 88/04; H04W 12/04; H04W 28/02; H04W 36/0022; H04W 36/32; H04W 48/06; H04W 48/20; H04W 64/00; H04W 72/14; H04W 92/10; H04W 12/0401; H04L 12/18; H04L 45/00; H04L 43/16; H04L 41/0816; H04L 67/104; H04L 12/1845; H04L 12/189; H04L 63/0492; H04L 63/18; H04L 1/1812; H04L 5/0035; H04L 51/18; H04L 45/72; H04L 47/122; H04L 47/27; H04L 47/34; H04L 69/16; H04L 47/10; H04L 61/6054; H04B 7/18539; H04B 7/0617; H04B 7/086; H04B 17/318; H04B 5/0031; H04B 5/00; H04B 7/26; H04J 11/0093; H04J 11/00; H04J 11/0073; H04J 11/0076; G01S 5/10; G01S 5/14; G01S 5/0236; G01S 19/48; G01S 5/0205; Y02D 70/144; Y02D 70/164; Y02D 70/166; Y02D 70/00; Y02D 70/1224; Y02D 70/1226; Y02D 70/1242; Y02D 70/1244; Y02D 70/1246; Y02D 70/1262; Y02D 70/1264; Y02D 70/142; Y02D 70/146; Y02D 70/21; Y02D 70/22; Y02D 70/23; Y02D 70/24; Y02D 70/25; Y02D 70/42; Y02D 70/162; Y02D 70/32
See application file for complete search history.

(56) References Cited

U.S. PATENT DOCUMENTS

| | | | |
|---|---|---|---|
| 9,078,144 B2 | 7/2015 | Harris et al. | |
| 9,467,845 B1 | 10/2016 | Rastogi et al. | |
| 2005/0053046 A1 | 3/2005 | Wang | |
| 2005/0071476 A1 | 3/2005 | Tejaswini et al. | |
| 2005/0239497 A1 | 10/2005 | Bahl et al. | |
| 2006/0153156 A1 | 7/2006 | Wentink et al. | |
| 2007/0242643 A1 | 10/2007 | Chandra et al. | |
| 2008/0291875 A1* | 11/2008 | Kang | H04W 36/0061 370/331 |
| 2009/0291686 A1* | 11/2009 | Alpert | H04W 36/0085 455/436 |
| 2010/0112980 A1* | 5/2010 | Horn | H04W 48/20 455/411 |
| 2010/0234010 A1* | 9/2010 | Fischer | H04J 11/0093 455/422.1 |
| 2010/0278066 A1* | 11/2010 | Hole | H04W 36/0061 370/252 |
| 2011/0274040 A1 | 11/2011 | Pani et al. | |
| 2012/0120799 A1 | 5/2012 | Brisebois et al. | |
| 2012/0129517 A1* | 5/2012 | Fox | H04L 41/5025 455/425 |
| 2012/0236776 A1* | 9/2012 | Zhang | H04W 48/12 370/312 |
| 2013/0070738 A1 | 3/2013 | McCann et al. | |
| 2013/0083783 A1* | 4/2013 | Gupta | H04W 88/16 370/338 |
| 2013/0095789 A1* | 4/2013 | Keevill | H04W 12/0609 455/411 |
| 2013/0102313 A1* | 4/2013 | Tinnakornsrisuphap | H04W 36/22 455/436 |
| 2013/0171964 A1* | 7/2013 | Bhatia | H04W 12/08 455/411 |
| 2013/0219471 A1* | 8/2013 | Brown | H04W 12/02 726/4 |
| 2013/0272148 A1 | 10/2013 | Fong et al. | |
| 2013/0303176 A1 | 11/2013 | Martin et al. | |
| 2013/0324075 A1 | 12/2013 | Andrianov et al. | |
| 2014/0003354 A1 | 1/2014 | Ekici et al. | |
| 2014/0016628 A1 | 1/2014 | McCann et al. | |
| 2014/0029420 A1 | 1/2014 | Jeong et al. | |
| 2014/0031031 A1 | 1/2014 | Gauvreau et al. | |
| 2014/0044029 A1 | 2/2014 | Chou et al. | |
| 2014/0092731 A1 | 4/2014 | Gupta | |
| 2014/0092734 A1 | 4/2014 | Ljung | |
| 2014/0094122 A1* | 4/2014 | Etemad | H04W 76/14 455/41.2 |
| 2014/0100962 A1 | 4/2014 | Rajagopalan et al. | |
| 2014/0126563 A1 | 5/2014 | Chen et al. | |
| 2014/0226487 A1 | 8/2014 | Forssell et al. | |
| 2014/0233386 A1 | 8/2014 | Jamadagni et al. | |
| 2014/0242993 A1* | 8/2014 | Dahlen | H04W 36/30 455/436 |
| 2014/0242996 A1 | 8/2014 | Nakamura et al. | |
| 2014/0256348 A1* | 9/2014 | Wirola | H04W 64/00 455/456.1 |
| 2014/0342705 A1 | 11/2014 | Harris et al. | |
| 2014/0349662 A1 | 11/2014 | Ekici et al. | |
| 2015/0056990 A1* | 2/2015 | Persson | H04W 8/08 455/434 |
| 2015/0065133 A1 | 3/2015 | Cui et al. | |
| 2015/0085650 A1 | 3/2015 | Cui et al. | |
| 2015/0189547 A1 | 7/2015 | Forssell | |
| 2015/0195094 A1 | 7/2015 | Yu et al. | |
| 2015/0215820 A1* | 7/2015 | Ye | H04W 28/08 370/235 |
| 2015/0264622 A1 | 9/2015 | Ueda | |
| 2015/0282058 A1* | 10/2015 | Forssell | H04W 48/18 455/552.1 |
| 2015/0289182 A1* | 10/2015 | Peisa | H04W 48/20 370/331 |
| 2015/0319672 A1 | 11/2015 | Hedberg et al. | |
| 2015/0327141 A1 | 11/2015 | Jung et al. | |

(56) References Cited

U.S. PATENT DOCUMENTS

| | | | |
|---|---|---|---|
| 2015/0382254 A1 | 12/2015 | Pakniat et al. | |
| 2016/0043937 A1* | 2/2016 | Phuyal | H04W 48/18 370/329 |
| 2016/0044634 A1 | 2/2016 | Seo et al. | |
| 2016/0044727 A1* | 2/2016 | Zisimopoulos | H04W 48/02 455/41.2 |
| 2016/0057680 A1* | 2/2016 | Koskinen | H04W 36/22 370/338 |
| 2016/0080991 A1* | 3/2016 | Harris | H04W 28/0284 455/436 |
| 2016/0135188 A1* | 5/2016 | Dhanda | H04W 72/042 370/329 |
| 2016/0337085 A1 | 11/2016 | Yu et al. | |
| 2016/0366665 A1 | 12/2016 | Xia | |
| 2018/0007543 A1* | 1/2018 | Lee | H04L 5/00 |

FOREIGN PATENT DOCUMENTS

| | | |
|---|---|---|
| JP | 2009533954 A | 9/2009 |
| JP | 2013046212 A | 3/2013 |
| JP | 2014515579 A | 6/2014 |
| WO | 2011/060997 A1 | 5/2011 |
| WO | 2012/166671 A1 | 12/2012 |
| WO | 2014/056544 A1 | 4/2014 |
| WO | 2014/074109 A1 | 5/2014 |
| WO | 2014/113103 A1 | 7/2014 |
| WO | 2016/041569 A1 | 3/2016 |
| WO | 2016/202861 A1 | 12/2016 |

OTHER PUBLICATIONS

"Signal Strength Threshold for Deferrable Services", 3rd generation partnership project z, TSG-C SWG2.1, Motorola, 2 pages.
"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.6.0, Jun. 2015, pp. 1-449.
International Search Report and Written Opinion received for corresponding Patent Cooperation Treaty Application No. PCT/US2015/041073, dated Dec. 3, 2015, 10 pages.
Office action received for corresponding Korean Patent Application No. 2017-7010197, dated Aug. 29, 2017, 6 pages of office action and 6 pages of office action translation available.
Office action received for corresponding Japanese Patent Application No. 2017-533690, dated May 21, 2018, 7 pages of office action and 9 pages of office action translation available.
Office Action received for corresponding European Patent Application No. 14765952.8, dated May 23, 2018, 9 pages.
International Search Report and Written Opinion received for corresponding Patent Cooperation Treaty Application No. PCT/EP2014/069585, dated May 19, 2015, 15 pages.
Einsiedler et al., "Efficient Transmission of Smartphone Application Traffic in Wireless Access Networks", 2nd IEEE International Conference on Mobile Cloud Computing, Services, and Engineering (MobileCloud), Apr. 8-11, 2014, pp. 186-193.
"IEEE Standard forInformation technology—Telecommunications and information exchangebetween systems—Local and metropolitan area networks—Specific requirements Part 11: Wireless LAN Medium AccessControl (MAC)and Physical Layer (PHY) Specifications", IEEE Std 802.11u™-2011, Feb. 25, 2011, 208 pages.
"Draft Standard for Information Technology—Telecommunications and information exchange between systems—Local and metropolitan area networks—Specific requirements—Part 11: Wireless LAN Medium Access Control (MAC) and Physical Layer (PHY) specifications", IEEE P802.11aq™/D1.2, May 10, 2015, pp. 1-41.
"3rd Generation Partnership Project; Technical Specification Group GSM/EDGE Radio Access Network; Radio transmission and reception (Release 12)", 3GPP TS 45.005, V12.5.0, Mar. 2015, pp. 1-271.
Non-Final Office action received for corresponding U.S. Appl. No. 14/819,066, dated Jul. 12, 2016, 10 pages.
Final Office action received for corresponding U.S. Appl. No. 14/819,066, dated Feb. 2, 2017, 12 pages.
Non-Final Office action received for corresponding U.S. Appl. No. 14/854,486, dated Feb. 28, 2017, 10 pages.
International Search Report and Written Opinion issued in corresponding International Application No. PCT/EP2016/076536 dated Mar. 24, 2017, 9 pages.
Non-Final Office action received for corresponding U.S. Appl. No. 14/854,847, dated Mar. 23, 2017, 17 pages.
"WifiManager", Android Developers, Retrieved on Sep. 7, 2017, Webpage available at : https://developer.android.com/reference/android/net/wifi/WifiManager.html.
"Evaluations of RAN Congestion Reporting Solutions", SA WG2 Meeting #103, DRAFT S2-141815, Agenda Item: 7.2, T-Mobile USA Inc., May 19-23, 2014, pp. 1-6.
Non-Final Office action received for corresponding U.S Appl. No. 14/854,486, dated Sep. 5, 2017, 12 pages.

* cited by examiner

| "NokiaNetworks" | Network assistance data |
|---|---|
| ssid-r12 (1-30 octets) | bssid-r12 (48 bits) |
| | hessid-r12 (48 bits) |

Figure 1

| SystemInformationBlockType17 [36.331] | |
|---|---|
| ssid-r12 | "N" (short value minimizes overhead) |
| bssid-r12 48 bits (6 octet) | 002A6F (3 octets): 03 (1 octet) XX (2 octets or 16 bits)<br>- Nokia Solutions and Networks Vendor Specific Attribute = 002A6F (HEX) = 28458 (decimal) ; See RFC2865 & https://www.iana.org/assignments/enterprise-numbers/enterprise-numbers<br>- Additional network knowledge sharing data may be conveyed over latter 3 octets using multiple TBD reserved NSNMAC address, or over extended SSID name) |
| hessid-r12 48 bits | (Optional/ Omit) |

Figure 2

| SIB17 BSSID - last 2 octets | Bits | # Values | |
|---|---|---|---|
| Protocol support indication | 3 | | May also indicate MAC CEusage support level |
| Baseline congestion information | DL congestion | 2 | 4 | 0,1,2,3 (higher is more congested) |
| | UL congestion | 2 | 4 | 0,1,2,3 (higher is more congested) |
| | Congestion time window (W) | 2 | 4 | 0.5,2.5,10.5,42.5 mins |
| Congestion over 4*W | Relative DL congestion | 1 | 2 | 0 = Wait, e.g. May improve in 4 *Wmins, |
| | Relative UL congestion | 1 | 2 | 1 = Transfer, e.g. Less likely to improve |
| UE attempt randomization interval (i) | 2 | 4 | 30 * 2^i seconds |
| TBD | 3 | | Possibly.<br>-eNB configuration hash<br>-MAC CEsupport level<br>- Per T-IMSI transfer start time &/or randomization &/or RACHcode guidance<br>-Congestion on additional time scales, or in other cells |
| Total | 16 | | |

Figure 3

| bssid-r12 (48 bits) Network assistance | Bits | |
|---|---|---|
| UEtypespecific congestion | 2 | e.g. congestion due to Apple Ues |
| Limitation on UL Reports | 2 | To be defined |
| Neighboring cell congestion | 4 | Future Use |
| Total | 8 | |

| bssid-r12 (48 bits) Network assistance data | | Bits | | |
|---|---|---|---|---|
| Transfer information | Transfer identifier (TI) | TBD | | e.g. Hashed version of T IMSI |
| | Recommended start time | 6 | | 1,2,3,4,5,6,7,8,9,10,12,14,16,18,20,25,30,60,seconds; 1.5,2,2.5,3,3.5,4,4.5,5,5.5, 6,6.5,7.5,8.5,9.5,10.5,11.5,12.5,13.5,14.5,15.5,16.5,17.5,18.5,19.5,20.5,21.5,22.5, 23.5,24.5,25.5,26.5,27.5,28.5,29.5,30.5,31.5,32.5,33.5,34.5,35.5,36.5,37.5,38.5,39.5, 40.5,41.5,42.5 mins |
| | TBD (e.g. when new cell) | 1 | | |
| Total | | 8 | | |

Figure 4

| WLAN-OffloadConfig [36.331] | |
|---|---|
| thresholdRSRP-r12-Low-r12 & thresholdRSRP-r12-High-r12 | TBD INTEGER(0..97) |
| thresholdRSRQ-Low-r12 & thresholdRSRQ-High-r12 | TBD INTEGER(0..34) |
| thresholdBeaconRSSI-Low-r12 & thresholdBeaconRSSI-High-r12 | TBD INTEGER(0..255) |

Figure 5

DELIVERY OF CELLULAR NETWORK INSIGHTS TO SUBSCRIBER DEVICES THROUGH SSID VIA CELLULAR SYSTEM INFORMATION BLOCK

RELATED APPLICATION

This application was originally filed as PCT Application No. PCT/US2015/041073 filed Jul. 20, 2015, which claims priority to U.S. Application No. 62/175,676 filed Jun. 15, 2015 and PCT Application No. PCT/EP2014/069585, filed Sep. 15, 2014.

CROSS REFERENCE TO RELATED APPLICATIONS

This application is related to and claims the benefit and priority of Patent Cooperation Treaty (PCT) Patent Application No. PCT/EP2014/069585, filed Sep. 15, 2014, which is hereby incorporated herein by reference in its entirety. This application is also related to and claims the benefit and priority of U.S. Provisional Patent Application No. 62/175,676 filed Jun. 15, 2015, which is hereby incorporated herein by reference in its entirety.

BACKGROUND

Field

Network insights may be useful in various communication networks. For example, certain cellular or similar networks may benefit from the delivery of cellular network insights to subscriber devices through service set identifier (SSID).

Description of the Related Art

The use of mobile wireless devices for sending and/or receiving data is increasing. At the same time, the delivery of video data is consuming a larger and larger share of available wireless capacity, both because of the popularity of video and because video applications inherently consume relatively great amounts of data.

Various techniques such as media optimization and adaptive streaming servers promise to significantly increase system capacity and video quality in wireless networks such as third generation partnership project (3GPP) long term evolution (LTE) networks. For example, media optimizer and adaptive streaming servers can manage downloading of video to user equipment, such as a camera phone, smart phone, tablet computer, media play with wireless capability, or the like, just in time to be played. Such an approach may avoid waste of resources when a user abandons a video before the video is complete, because the approach can avoid transferring data that will never be used.

A user may frequently experience a gap in coverage or impaired coverage, so that under some circumstances video will be not be available at the moment it is needed. Delivering data before it is needed, which may be referred to as pre-filling data, can avoid interruption or degradation of video quality. This discussion will be presented primarily in terms of video data, but the mechanisms described here may be applied to any circumstances in which data is delivered as needed in order to use transmission capacity efficiently, but in which conditions are evaluated to determine whether data should be delivered before it is immediately needed.

The need for pre-filling of data can vary based on the particular circumstances of a user equipment (UE). In addition, turning to the example of video data, much video data can be configured so as to be playable only by a single UE, as in the case in which video is encrypted with a key provided only to a single UE or a few UEs, or in the case in which digital rights management (DRM) is used, so that video is configured to be transferable only to a single UE.

If video data is to be reliably delivered, however, accommodations may need to be made for areas experiencing poor coverage or significant loads, interfering with the ability of a UE to receive data just in time for playback. Under such circumstances, the UE may benefit from receiving data during times when it may be efficiently delivered, so that the data can be available for playback during a period of slow or no delivery. The control if video transfers can be related to network knowledge sharing, or the sharing of network analytic insights.

Data analytics insights are transforming various industries by linking these insights with decisions. Network infrastructure can generate network insights, for example, from the evolved node B (eNB), Radio Applications Cloud Server (RACS) and customer experience manager (CEM). These types of insights can be useful to many devices or elements of the network. For instance, this type of information can be useful to mobile applications also known as apps. An app may be considered to be a self-contained program or piece of software designed to fulfill a particular purpose, for example as downloaded by a user to a mobile device. Apps on mobile devices (e.g., smartphones, tablets, other portable computing devices, etc.) may make many decisions, using nuanced and rapidly changing app knowledge.

SUMMARY

According to certain embodiments, a method can include detecting, by a device, at least one advertised value of non-cellular access, wherein the at least one advertised value is received by the device over a cellular system information block message. The method can also include extracting, from the at least one advertised value, at least one cellular network insight for a cellular network condition.

In certain embodiments, a method can include detecting a first level of network congestion on a cellular network. The method can also include, in response to the detecting of the first level of network congestion, transmitting a non-cellular identifier related to non-cellular access, wherein the non-cellular identifier comprises a basic service set identifier value over the cellular network, wherein the basic service set identifier value encodes the first level of network congestion on the cellular network.

An apparatus, according to certain embodiments, can include at least one processor and at least one memory including computer program code. The at least one memory and computer program code can be configured to, with the at least one processor, cause the apparatus at least to detect, for a device, at least one advertised value of non-cellular access, wherein the at least one advertised value is received by the device over a cellular system information block message. The at least one memory and computer program code can also be configured to, with the at least one processor, cause the apparatus at least to extract, from the at least one advertised value, at least one cellular network insight for a cellular network condition.

An apparatus, in certain embodiments, can include at least one processor and at least one memory including computer program code. The at least one memory and computer program code can be configured to, with the at least one processor, cause the apparatus at least to detect a first level of network congestion on a cellular network. The at least one memory and computer program code can also be configured to, with the at least one processor, cause the apparatus at least to, in response to the detection of the first level of network congestion, transmit a non-cellular identifier related to non-cellular access, wherein the non-cellular identifier comprises a basic service set identifier value over the cellular network, wherein the basic service set identifier value encodes the first level of network congestion on the cellular network.

According to certain embodiments, an apparatus can include means for detecting, by a device, at least one advertised value of non-cellular access, wherein the at least one advertised value is received by the device over a cellular system information block message. The apparatus can also include means for extracting, from the at least one advertised value, at least one cellular network insight for a cellular network condition.

In certain embodiments, an apparatus can include means for detecting a first level of network congestion on a cellular network. The apparatus can also include means for, in response to the detecting of the first level of network congestion, transmitting a non-cellular identifier related to non-cellular access, wherein the non-cellular identifier comprises a basic service set identifier value over the cellular network, wherein the basic service set identifier value encodes the first level of network congestion on the cellular network.

A computer program product can encode instructions for performing a process, according to certain embodiments. The process can be any of the above-described methods. 100161A non-transitory computer-readable medium can be encoded with instructions that, when executed in hardware in certain embodiments, perform a process. The process can be any of the above-described methods.

BRIEF DESCRIPTION OF THE DRAWINGS

For proper understanding of the invention, reference should be made to the accompanying drawings, wherein:

FIG. 1 illustrates a data structure according to certain embodiments.

FIG. 2 illustrates a further data structure according to certain embodiments.

FIG. 3 illustrates an additional data structure according to certain embodiments.

FIG. 4 illustrates further data structures according to certain embodiments.

FIG. 5 illustrates thresholds in connection with certain embodiments.

DETAILED DESCRIPTION

Figure 6:
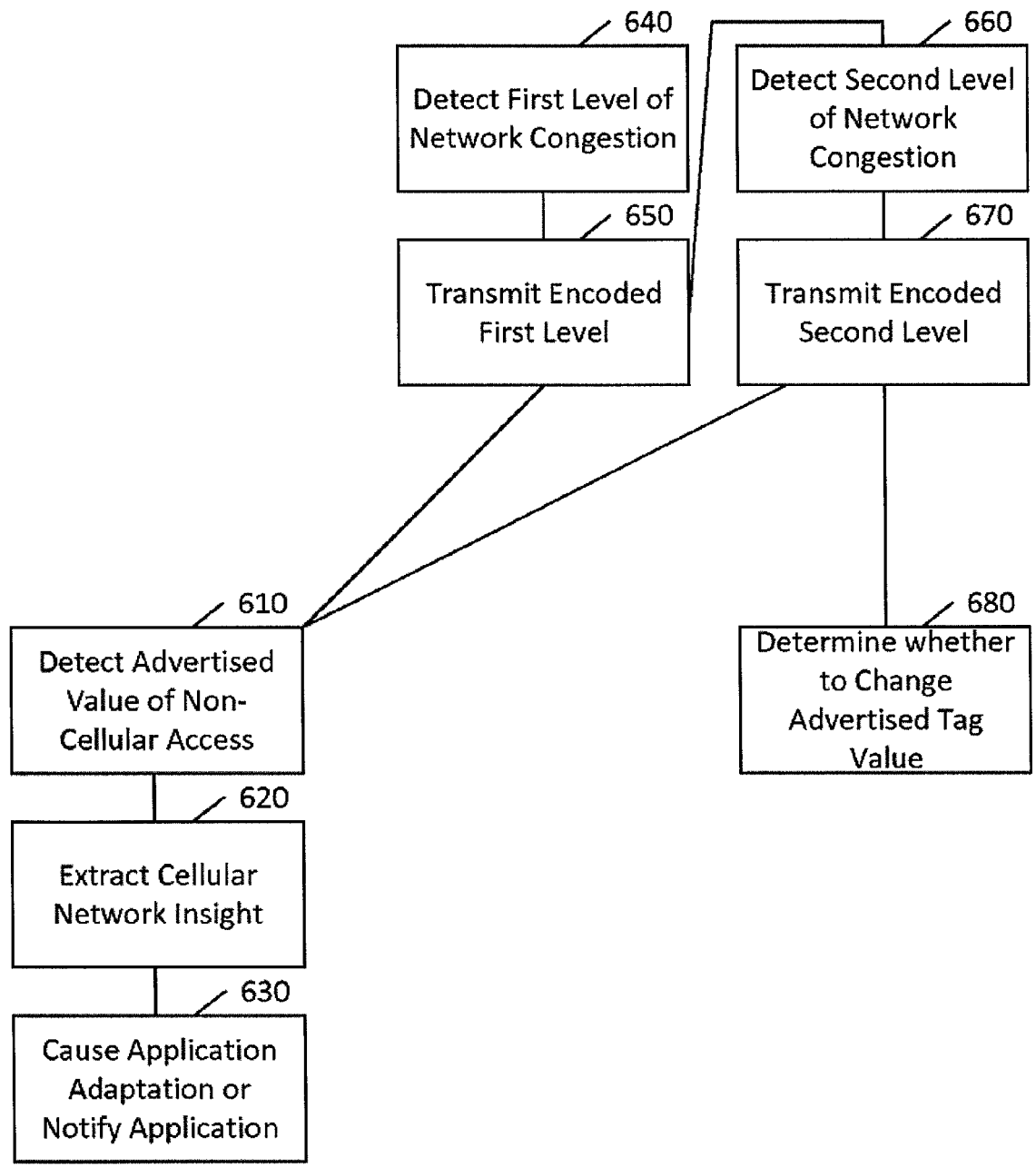
FIG. 6 illustrates a method according to certain embodiments.

Certain embodiments relate generally to wireless communications and more specifically to controlling or assisting the sending and/or retrieval of data, such as video data, by user equipment from a wireless network while the data is used by the user equipment. Embodiments may generally relate to communications systems, such as wireless communications networks, and may specifically relate to mechanisms for performing this assisting by delivering network insights to a device, such as mobile or wireless device.

In certain embodiments, network assistance data can be conveyed through the Wi-Fi overhead information which is then being tunneled through SIB17 over LTE system information block used to direct UEs to utilize a particular Wi-Fi SSID. The network assistance data may be, for example, network congestion data.

Certain embodiments may provide a knowledge sharing protocol between UEs and evolved Node Bs (eNBs) or other network equipment. Additionally, by then tunneling this protocol over the LTE, the network assistance data can be available over the entire cellular coverage area. In contrast, with the direct usage of Wi-Fi SSID, the network assistance data may then only be available in a small subset of the geographic coverage area, for example near small cells with co-located Wi-Fi capability. Thus, this SIB17/SSID tunneled over LTE can be used not just over small cells but also over macro cells.

Certain embodiments provide a mechanism to enable identifying that subscribers are going to perform a proprietary knowledge sharing protocol between the subscriber device and the network, for example sharing congestion information down to the mobile, and obtaining advanced knowledge of anticipated user traffic activity up from the UE.

Certain embodiments can provide easy access to insights that apps can use in their internal decisions. Additionally, certain embodiments may enable identifying to subscribers that the eNB supports a proprietary knowledge sharing protocol between the subscriber device and the network, for example where this protocol performs sharing congestion information down to the mobile over the entire cellular coverage area. Additionally, certain embodiments can provide for the eNB to convey certain network insights or knowledge to, for example, share congestion information down to the mobile over the entire cellular coverage area.

Additionally, certain embodiments provide a solution that does not conflict with existing standards and technologies, such as standards in place within existing subscriber devices. Furthermore, certain embodiments provide a solution that enables the eNB to rapidly provide this information, without the need for bringing significant complexity such as that possibly involved with the eNB directly running code which executes higher level application knowledge/application protocols within the eNB. Furthermore, certain embodiments provide a solution that enables delivering this knowledge sharing down to the UE, in a way which that enables certain existing operating systems to transparently pass this information on to applications using existing operating system application programming interfaces (APIs).

Certain embodiments may be configured to avoid avoid inefficiencies by sharing knowledge/preferences between UE/Apps and eNB. Inefficiencies can include eNB inactivity. Thus, in certain embodiments C-DRX decisions can use knowledge of UE traffic preferences. Similarly, UE decisions can use eNB knowledge of congestion.

This sharing of information may enable a host of things including, for example, improving battery life and capacity, avoiding excess UE connected/modem-on time and excess RRC transitions, and creating numerous additional improvements from joint decision-making.

Certain embodiments may define a protocol for this knowledge sharing. This protocol may relate to radio level messaging, avoiding conflicts with current and future LTE standards releases.

Certain embodiments can address a situation when there is to be a new connection or a handoff/handover. A UE can determine if an eNB supports knowledge sharing based on virtual basic service set identification (B-SSID) being broadcast over LTE system information block 17 (SIB17). The B-SSID can be a dedicated medium access control (MAC)

address value. This approach can avoid conflicts/problems with existing standard/UEs. Furthermore, certain embodiments can work with both idle and connected UEs.

In response to the broadcast, the UE can convey an uplink (UL) knowledge sharing message to the eNB using an uplink (UL) MAC control element (CE) with a currently reserved index.

The eNB can transmit downlink (DL) knowledge sharing message with a MAC CE with currently reserved index. This DL message can be sent if eNB receives an UL, with MAC CE reserved index, or if the eNB checks the UE's international mobile station equipment identity (IMIEI) software version (IMEISV).

Certain embodiments may avoid conflict with an LTE standard by, for example, using SIB17. In certain embodiments, neither the UE nor the eNB may transmit a knowledge sharing message, for example a MAC CE on a reserved index, unless the transmitter knows that the receiver supports the knowledge sharing.

For example, a UE may avoid transmitting a knowledge sharing message until the UE verifies eNB supports knowledge Sharing. For example, the UE may verify by detecting a knowledge sharing message from the eNB over SIB17/SSID.

Alternatively, the eNB can avoid transmitting a knowledge sharing message until the eNB verifies that the UE has knowledge sharing. For example, the eNB may wait until the eNB receives a knowledge sharing message from the UE over a reserved MAC CE.

If a currently reserved MAC CE index is defined in a later LTE release, then the eNB can avoid transmitting that new MAC CE index to earlier release UEs.

The UE may only transmit on a MAC CE index indicated by the protocol on the DL, over SIB17. This may avoid transmitting on a wrong MAC CE index.

The eNB can know the UE's release, for example from "UE Capabilities" in radio resource control (RRC) and/or a UE knowledge sharing message on UL. Thus, the eNB may be able to use the appropriate MAC CE index set for UEs from that LTE release.

The eNB can transmit a new MAC CE index only to a new LTE release UE. This may be determined from RRC "UE Capabilities" or an UL MAC CE message.

These and similar mechanisms can prevent previous release knowledge sharing UEs from receiving a new MAC CE index. These mechanisms, however, can also allow UEs and eNBs for the new LTE release to use knowledge sharing with an updated index set for that LTE release.

In certain embodiments, the ordinary operation of SIB17 is not destroyed. Thus, in certain embodiments SIB17 can also be simultaneously utilized as intended by the standards. For example, up to 16 WLAN-Ids can be conveyed; maxWLAN-Id-r12 INTEGER::=16, as described in 3GPP technical specification (TS) 36.331, which is hereby incorporated herein by reference.

FIG. 1 illustrates a data structure according to certain embodiments. As shown in FIG. 1, the data structure can indicate a vendor, such as Nokia Networks, using SSID. The BSSID and HESSID can provide network assistance data.

FIG. 2 illustrates a further data structure according to certain embodiments. For example, FIG. 2 illustrates an implementation in connection with SIB 17.

In this case, the value for SSID may be "N," or another short value, which may minimize overhead. BSSID can indicate a vendor specific attribute and some knowledge sharing data, and the HESSID can be optional or omitted.

Thus, in certain embodiments, SIB 17: 002A6F (3 octets): to be determined (TBD) (3 octets). In this example, the vendor specific attribute=002A6F (HEX)=28458 (decimal). See RFC 2865 and https://www.iana.org/assignments/enterprise-numbers/enterprise-numbers, which are hereby incorporated herein by reference.

Additional network knowledge sharing data may be conveyed over the latter 3 octets using multiple TBD reserved MAC address, or over extended SSID name.

FIG. 3 illustrates an additional data structure according to certain embodiments. For example, FIG. 3 illustrates the last two octets of BSSID. As shown in FIG. 3, the first three bits may be a protocol support indication. The protocol support indication may indicate the MAC CE usage support level.

The next six bits may provide baseline congestion information, including two bits for downlink congestion, two bits for uplink congestion, and two bits for congestion time window. In this particular example, the four values for congestion levels may be 0, 1, 2, and 3, in which the higher the number the more congestion is indicated. Alternatively, higher numbers could be used to indicate lower congestion. The four possible values of congestion time window may indicate a number of minutes, such as 0.5, 2.5, 10.5, and 42.5 minutes.

The next two bits can indicate congestion over a four window period (4*W). The first bit can indicate relative DL congestion, while the second bit can indicate relative UL congestion. A zero may indicate that a UE should wait if the UE seeks to avoid congestion, because it is expected that the congestion may improve within four windows. On the other hand, a one may indicate that the UE should transfer if the UE seeks to avoid congestion, because it is expected that congestion is less likely to improve within four windows. Four windows here is given as an example of a possible reporting duration. Other durations, such as three or five windows are also permitted. The decision as to which of the two values to report can be based on comparing an expectation of congestion improvement to a threshold. Alternatively, the decision may be based on some other factor, such as whether off-loading of the UE is desired or undesired.

The next two bits can convey a UE attempt randomization interval. This can be a value, n, which indicates that the interval should be $30*2^n$ seconds.

The last three bits may be reserved or TBD for other purposes. These purposes may be an eNB configuration, a MAC CE support level, a per temporary international mobile subscriber identity (T-IMSI) transfer start time and/or randomization and/or random access channel (RACH) code guidance. Alternatively, the purpose may be to indicate congestion on additional timescales or in other cells. Other uses are also permitted.

FIG. 4 illustrates further data structures according to certain embodiments. As shown in FIG. 4, a BSSID can include two bits for UE type specific congestion, such as congestion due to users of an Apple Corp. device or congestion due to users of other specific types or categories of devices, such as devices using other operating systems. Two bits can also be used to indicate a limitation on UL reports and four bits can be used to indicate neighboring cell congestion.

Also, or alternatively, the BSSID can include eight or more bits of transfer information. This information can include a transfer identifier (TI), which may be a hashed version of T-IMSI. The transfer information can also include a recommended start time. Six bits can provide many different options for indicating a variety of different possible start times, such as 1, 2, . . . 10, 12, . . . 20, 25, 30, or 60 seconds. Other values or value distributions can be assigned to the six bits. One or more additional bits can be reserved for other purposes, such as providing congestion information corresponding to other cells. This information is useful as it enables the application in a variety of ways. For example, the application may use this to consider whether it is more advantageous to perform a background transfer now in a current cell, or later after it potentially moves.

If SIB17 conveys not only protocol support but also network knowledge to be shared then frequent changes to SIB17 avoid changing tag value and waking up UEs. Certain embodiments may advertise SIB change, with tag value, when a major network congestion change occurs.

Certain embodiments may use scrambling, to limit access to any network knowledge shared, for example over SIB 17. Scrambling may be a function of other parameters, for example current cell ID number, PCI, time of day, location, encryption key, and may include redundancy. In certain embodiments, the scrambling can be configured so that it can be verified by the UE.

Certain embodiments involve configuring a threshold corresponding to the SIB17 SSID information use, such that other UEs will ignore the SIB17 payload. For example, certain embodiments may utilize signal strength threshold, WLAN-OffloadConfig, to cause other UEs to ignore SIB17. This may, for example, involve setting both threshold values to be either very high or very low. In this case, both means to set both the high threshold and the low threshold to the same value, and then optionally have that same value be either a very high or a very low value. In another case, one may set the low threshold to be actually higher than the high threshold, such that there is no value that could satisfy both the high and low threshold.

FIG. 5 illustrates thresholds in connection with certain embodiments. As shown in FIG. 5, there can thresholds for reference signal received power (RSRP), for reference signal received quality (RSRQ), and beacon reference signal strength indicator (RSSI). Each parameter can include a low threshold and a high threshold. The values for the thresholds can an integer within a predefined range.

In this way, in certain embodiments, when there is a new connection, handoff, handover, or the like, a UE can determine whether an eNB or other access node supports knowledge sharing based on the last 2 or 3 octets of the BSSID This approach may be able to work with UEs both in idle mode and in connected mode. Furthermore, a signal strength threshold can be set, which can allow other UEs to ignore. Additionally, certain embodiments can avoid excessive tag value changes, which might otherwise wake up UEs.

In response, a UE can convey an UL knowledge sharing message to the eNB using a UL MAC CE with currently reserved index. Then, the eNB can transmit DL knowledge sharing message, MAC CE with currently reserved index, if eNB receives UL MAC CE with reserved index or the eNB can check the UE's IMEISV.

Certain embodiments can convey control information jointly with the MAC CE over a proprietary index.

Similarly, if there is a new connection or a handoff completes, or the like, a UE can be prevented from transmitting a knowledge sharing message until the UE verifies eNB supports knowledge sharing, and/or until the UE detects knowledge sharing message from an eNB over SIB17/SSID, or MAC CE. The UE can, in certain embodiments, only transmit on MAC CE index indicated by the SIB17 SSID configuration.

Utilizing the signaling can help to avoid congestion storms/random-access storms on the uplink. For example, each time the eNB transmits an indication over the knowledge sharing protocol to a UE, indicating low congestion, there is a probability that one or more UEs will, in response, initiate a transfer. Consequently, the network/eNB congestion estimate may also be incrementally adjusted in response to the number of network/eNB initiated low congestion indications (recently) transmitted to UEs. In one embodiment, the signaling indicates a random on back off congestion interval duration, in order to randomize the timing of the UE access attempts in response to a low congestion notification.

The eNB may also indicate to groups of UEs, a RACH. The indication can provide location information, such as a special RACH for UEs currently feeding to transfer only background traffic. The indication can also provide code information, such as coordination information/seed information to avoid RACH collisions within a group of UEs likely to simultaneously access the same RACH.

Certain embodiments can convey unicast signaling, addressing a single UE, for example using TIMSI to direct that a UE begin a transfer. The eNB may also indicate to specific Uses the time for that specific UE to initiate a transfer. In this case, each connected or idle UE may then be configured to monitor the SIB for guidance at a particular set of times. This can further improve network utilization efficiency. This could potentially use a hashed version of a T-IMSI, or a pre-agreed UE signature. When the UE is connected, the eNB can instead use the DL MAC CE for this purpose. Such alternative mechanism may be useful, for example, when the SIB17 is full and/or not timely.

Certain embodiments can configure an offset such that specific UEs will monitor the SIB17 at a specific subset of the times when it is being broadcast. This may help to minimize RACH overload in certain instances, if congestion is detected and transfer of the UE may be needed.

Certain embodiments can use a consistent tag value to enable avoiding waking up all UEs to monitor for this SIB change, for example when there are minor/frequent changes in network congestion information. An updated tag value may be used when major congestion events occur, for example to wake up additional UEs, if needed. Thus, in certain embodiments an eNB may advertise the SIB change, with tag value, when a major network congestion change occurs. Furthermore, the eNB may update SIB17 with most recent congestion information, more frequently than advertising the SIB change with tag value.

For specific UEs actively monitoring for congestion changes, certain embodiments can configure the UE DRX/wake-up intervals to coincide with broadcast on the information over SIB17.

Furthermore, certain embodiments can use an LTE modem API to enable applications to obtain and extract the congestion information without the need to modify the UE operating system.

This tunneled Wi-Fi information over SIB can additionally indicate Wi-Fi congestion information. The eNB may also indicate native SSID values, for example values being broadcast by Wi-Fi co-located at small cells, indicating more or less network congestion.

The information provided in these ways can be used by both idle mode and connected mode UEs, as mentioned above. Thus, even idle mode UEs may benefit from knowledge sharing.

Furthermore, the knowledge shared can be scrambled, in order to control access to this information. Scrambling may be a function of other parameters, such as current cell ID number, PCI, time of day, location, or encryption key, and may include redundancy. Thus, scrambling may be able to be verified by the UE.

Fixed lengths of, for example, 48 bits can enable providing relatively detailed guidance. This can be accomplished more particularly using the last two octets of SIB 17, as illustrated, for example, in FIG. 3.

Certain embodiments can use an opaque eNB configuration indication, enabling the creation of detailed eNB key performance indicators (KPIs), while protecting the privacy of the eNB's exact/full/explicit configuration.

In addition to the above, there can be additional downlink payload and/or knowledge sharing attributes. The downlink knowledge sharing messaging can convey one or more specific information elements. These information elements can include one or more of: a short-term or long-term congestion, on one or more of the uplink and the downlink; a short-term or long-term congestion across both up and downlink, which could be a unitless number between one and 8 indicating the congestion state associated with whichever of the two link directions is more congested (this congestion estimate could correspond to a planned bidirectional transfer); an indication of the congestion over alternative wireless technologies, such as Wi-Fi; or an indication of the timescale or cells associated with the congestion estimate provided, for example indicating the timescale associated with the long-term congestion estimate provided over the knowledge sharing protocol.

These information elements can include an indication of a mobility congestion estimate, for example indicating that this is the likely congestion the UE will encounter if the UE is mobile, based on one or more neighbor/likely handoff cells, as opposed to a congestion estimate which is to be expected by the UE if the UE remains relatively static/in that location.

These information elements can include an indication of a recommended time for a transfer, for example within a specific time window indicated by the UE.

These information elements can include an indication of the transfer direction associated with the recommended time for the transfer. Furthermore, these information elements can include an indication of a recommended transfer size, in bytes and/or seconds, associated with the recommended time for the transfer. For example, this could apply in the case where the UE has requested/indicated it plans a particularly large transfer, but the network has identified a smaller uncongested opportunity and has recommended that the UE perform a fraction of the planned transfer during this opportunistic interval.

These information elements can include one or more of the following: an indication that the recommended time for a transfer corresponds to the anticipated transfer indicated by the UE in the uplink knowledge sharing protocol; an indication of the congestion in the cell resulting from a particular category of UEs, for example an indication of the congestion in the cell resulting from UEs from a particular UE provider or vendor, or corresponding to subscribers which support the knowledge sharing protocol; or an indication of congestion in one or more other cells, for example neighboring cells, or an explicit indication of the congestion in an overlay macro cell, which may be relevant for example when a UE is under a small cell, which is in the middle of the coverage area of the macrocell, and the UE has some mobility.

These information elements can include an indication of subscriber experience, for example quality of experience (QoE), corresponding to the experience of the lowest quality subscriber experience in that cell, wherein that subscriber is from a particular category of subscribers. For example, the QoE may be the lowest from a particular UE provider or vendor, or among the UEs using the knowledge sharing protocol in that cell or geographic region.

These information elements can include an indication of the likely sensitivity of the subscriber throughput to the signal strength at the UE. For example, this indication can provide a parameter to the UE which enables the UE to estimate the multiplicative change in the likely throughput achieved as the signal strength (RSRP or RSRQ) changes as the UE moves within that cell, while the cell has a constant level of congestion. In other words the subscriber can use this parameter within a predetermined function to estimate the degree to which changes in signal strength will correlate with faster or slower transfer opportunities.

These information elements can include any of the following: an indication of the RRC inactivity timer value currently planned to be used by the network/eNB for that UE; an indication of the eNB vendor type an/or knowledge sharing protocol version; or an indication that the UE should wait in idle mode until it enters another cell, at which point it should connect in order to determine the current congestion over the knowledge sharing protocol. The indication to wait in idle mode may further indicate specific neighboring cells, for example cells that are lower congestion, where the UE may use this approach.

These information elements can include an indication of the type of neighboring cells where the subscriber should subsequently attempt to connect to determine the congestion level. For example, the indication may indicate that the subscriber should connect in order to determine the congestion level over the knowledge sharing protocol only within cells with particular configurations, or cells of particular types, for example small cells, femto cells, or macro cells.

These information elements can include an indication that specific neighboring cells support the knowledge sharing protocol, e.g. using specific references such as cell names or associated cell broadcast information which will enable the UE to later identify that the UE is near such specific cells.

These information elements can include an indication that the knowledge sharing protocol support at that cell is ending shortly. For example, the indication may indicate the time interval after which the protocol support information should be deleted from the UE and/or the UE operating system/ecosystem.

These information elements can include the following: an indication to the UE indicating how to estimate the downlink cell congestion from RSRQ, for example compensating for the level of other cell interference also being received in that approximate location; or an indication to the UE indicating how to estimate the uplink cell congestion from the modulation coding sequence (MCS) assigned as a part of uplink grant(s).

These information elements can include an indication of the degree to which the UE can generate knowledge sharing protocol messaging over the uplink. For example, this indication may prohibit the UEs from transmitting long uplink knowledge sharing messaging in the case where the uplink is congested. This configuration may further be implicit such that the UE automatically determines that it is disallowed from transmitting one or more uplink knowledge sharing messages after it receives a message from the network indicating that the uplink is congested. Furthermore, this portion of the knowledge sharing protocol may prohibit all uplink knowledge sharing messaging, while still indicating that downlink knowledge sharing messaging may occur. Alternatively, this indication may allow the UE to perform messaging which indicates planned transfers, but which disallows providing knowledge sharing inputs on network configuration such as inactivity timer and/or discontinuous reception (DRx). Conversely, this may allow the UE to provide inputs with respect to inactivity timer and/or DRx, but disallow inputs with respect to planned transfers. The network may then configure this downlink indication in order to optimize the network performance, while considering the overhead generated by this uplink knowledge sharing messaging, and the observed benefits generated by this knowledge sharing messaging. Furthermore, the network may disallow this messaging from a subset of the UE devices, for example where the benefit of such messaging is expected to be smaller, or where the UE devices which tend to generate less traffic, or where subscriber device's power preference indicator indicates that performance is more important than conserving power.

In view of the above, certain embodiments provide and implement a knowledge sharing protocol. This knowledge sharing protocol can use specific mechanisms to convey network/eNB knowledge information to UEs. This sharing can permit applications on the UE to make better application relevant decisions, additionally considering this network/eNB knowledge information in the application relevant decisions being made within the UE.

Additionally, this protocol can advertise that the protocol is being supported to the UEs that also support the protocol. This advertisement may permit these UEs, or UE applications or UE operating systems that support the knowledge sharing protocol, to convey specific application relevant information to the network/eNB. This information may also permit the network/eNB to make more informed decisions, incorporating network/eNB information along with the application relevant information received over this protocol.

Furthermore, certain embodiments support a case in which a specific subset of the UEs in a network support this protocol. For example, this protocol may be a proprietary protocol that is implemented by only a subset of the UEs. In this case, the broader set of UEs may implement cellular standardized messaging, for example consistent with 3GPP LTE or LTE advanced. However, a specific subset of these UEs may have implemented an additional proprietary protocol, for example supporting this knowledge sharing protocol.

This network/eNB knowledge sharing protocol may then enable battery life and capacity benefits, for example by reducing the total amount of modem on time and/or power transmitted to/from the UE. The protocol may accomplish such reductions by, for example, avoiding scenarios in which there is excess/unnecessary subscriber modem on time, either because there is not a need from an application traffic perspective, for example a background transfer just completed, or a streaming playout buffer has just finished being overfilled to a deeper than necessary depth, and/or where the modem on time can be reduced because the transfer can instead occur where the network/eNB is relatively uncongested such that the total time to complete the transfer is relatively brief.

For example, note that if the link speed achieved during a transfer is increased by a multiplicative factor of ten, then it may be possible to reduce the total amount of current drain by that transfer by approximately a multiplicative factor of five. This follows from a case where the modem on time is reduced by approximately a multiplicative factor of ten, and the current drain during the download is increased only by a multiplicative factor of two, while it is downloading at a much higher link speed, one which is ten times faster. This is further a case in which the UE can immediately return to idle at the end of the background transfer. Thus, the UE can return to idle more quickly because the download completed more quickly, and optionally the UE can transition even more quickly to idle because the network knows that this particular transfer is a background transfer.

Certain embodiments relate to a method including detecting, by an application running on a wireless device, at least one Wi-Fi advertised value being, for example, advertised over a cellular system information block. The method may also include extracting, from the at least one Wi-Fi advertised value, at least one cellular network insight for a cellular network condition.

Also, certain embodiments relate a method including detecting, by an application running on a wireless device, at least one Wi-Fi advertised value being advertised over a cellular system information block message. The method may also include extracting, from the at least one cellular system information block message, at least a Wi-Fi advertised value, and extracting from the at least one Wi-Fi advertised value advertised over the LTE system information block, at least one cellular network insight for a cellular network condition.

Further, certain embodiments relate to an apparatus that includes at least one processor and at least one memory including computer program code. The at least one memory and computer program code can be configured, with the at least one processor, to cause the apparatus to at least detect at least one Wi-Fi advertised value being advertised over a cellular system information block message, and to extract, from the at least one Wi-Fi advertised value, at least one cellular network insight for a cellular network condition.

Moreover, certain embodiments relate to a computer program, embodied on a computer readable medium. The computer program, when run on a processor, can perform a method including detecting, by an application running on a wireless device, at least one Wi-Fi advertised value being advertised over a cellular system information block message. The method may also include extracting, from the at least one Wi-Fi advertised value, at least one cellular network insight for a cellular network condition.

Additionally, certain embodiments relate to an apparatus including means for detecting at least one Wi-Fi advertised value being advertised over a cellular system information block message. The apparatus may also include means for extracting, from the at least one Wi-Fi advertised value being advertised over a cellular system information block message, at least one cellular network insight for a cellular network condition.

Structure of the cellular insight being conveyed over non-cellular signaling being tunneled through cellular SIB may vary. The following are some examples.

In a further embodiment, the Wi-Fi advertised value being advertised over a cellular system information block message, can include a six octet BSSID value. In a further embodiment, the six octet BSSID value can include three octets conveying a vendor specific attribute defined as 002A6F (HEX)=28458 (decimal) within RFC 2865, followed by an additional number of bits, such as an octet equal to 03, indicating that the information is conveying a cellular insight to the UE, followed by an additional number of bits, such as the last two octets, indicating the cellular insight itself.

Furthermore, in certain embodiments, the Wi-Fi advertised values further include at least one of a zero length or omitted HESSID value, and a single letter SSID value. The minimization or omission of these values can minimize the amount of overhead required to convey the additional system information block.

In certain embodiments, the field within the BSSID, indicating the cellular insight itself, may be further divided into a first subregion conveying cellular insights to a first group of devices, such as devices manufactured by a first UE vendor, and the second subregion may convey cellular insights to a second group, such as devices manufactured by a second UE vendor. In further embodiments, within the field conveying the cellular insight, there may be additionally a subregion indicating cellular insights to devices being manufactured by both the first and the second UE vendor.

In a further embodiment, a final field indicating the cellular insight itself may be further divided into a first subregion conveying cellular insights to devices manufactured by a first UE vendor, and a second subregion conveying cellular insights to devices manufactured by a second UE vendor. Additionally, in certain embodiments, there may be a further subregion indicating cellular insights to devices being manufactured by both the first and the second UE vendor.

Certain embodiments may relate to an apparatus including means for detecting at least one Wi-Fi advertised value being advertised over a cellular system information block message at particular times, or time offsets. Thus, a first UE may monitor for cellular network insights at a first set of offsets when the Wi-Fi advertised value being advertised over a cellular system information block message is being transmitted. However, a second UE may monitor for cellular network insights at a second set of offsets when the Wi-Fi advertised value being advertised over a cellular system information block message is being transmitted.

In certain embodiments, the rules or mapping for encoding/decoding/extracting the network insight from the received Wi-Fi advertised value may include a function of other parameters including, for example, at least one of the current cell ID number, time of day, location, encryption key, a seed, or any combination thereof. According to an example embodiment, the actual insight itself may be hashed or encrypted for example using the prevailing macro LTE cell ID number, and/or a separate encryption key. This can enable the network to prevent apps that have not paid for access to the insights from being able to extract the insights. For example, apps which have not paid for access or full access to the insights may not have the encryption key, such that the SSID may be opaque.

According to certain embodiments, the rules or mapping for encoding/decoding/extracting the network insight from the received Wi-Fi advertised value may be such that the SSID value includes redundancy so that it can be signed and verified by the app detecting and decoding the SSID value. This may be similar to using forward error correction mechanisms or a long cyclic redundancy code (CRC)-like field on the end of the SSID such that the app can verify that the SSID dissected is actually a valid SSID, which is actually conveying a network insight.

In certain embodiments, an apparatus can include the following: means for assigning, at a base station in a wireless network, a signature using a context of the base station, wherein the assigning is performed so that the signature identifies at least a portion of a current configuration state of the base station; and means for sending an indication of the signature to one or more UEs. Such embodiments may then include using a special protocol wherein the eNB additionally indicates the eNB vendor type over this protocol.

Certain embodiments may avoid other subscribers from utilizing the information being tunneled through the non-cellular signaling over the SIB. There may be various ways of accomplishing such avoidance, as already indicated above. The following provide some further examples.

For example, certain embodiments relate to configuring a threshold corresponding to the SIB17 SSID information use, such that other UEs will ignore the SIB17 payload. In this embodiment, the LTE system information block 17 can advertise a signal strength threshold (WLAN-OffloadConfig) which can cause UEs not implementing the proprietary protocol to ignore SIB17. This threshold setting may, in certain embodiments, involve setting both threshold values to be either very high or very low. In another case, one may set the low threshold to be actually higher than the high threshold, such that there is no single value which simultaneously satisfies both the high and low threshold.

Updating the information being advertised can be done in various ways. For example, certain embodiments relate to a method including detecting a first level of network congestion on a first wireless network. The method also includes, in response to the detecting of the first level of network congestion, transmitting a basic service set identifier (BSSID) value over a second wireless network, where the BSSID value encodes the first level of network congestion. The method may then include detecting a second level of network congestion on the first wireless network, and, in response to the detecting of the second level of network congestion, transmitting a second BSSID value over the second wireless network, where the second BSSID value encodes the second level of network congestion.

Updating the information being advertised with respect to tag value management can be done in various ways. The following is an example. In certain embodiments, a method can include configuring a tag value in response to a change in the SIB17 SSID value, such that other UEs will or will not wake up to monitor to obtain the new and updated SIB17 payload. In such embodiments, if the change in the cellular networking insight is smaller than a threshold, then the corresponding tag value may not be changed. However, if the change in the cellular network insight is larger than a threshold, then the corresponding tag value may be changed. In certain embodiments, the cellular networking insight may correspond to a cellular network congestion condition.

Further elaborating on this point, using a consistent tag value even while the SIB17 information changes, can help in avoiding waking up all UEs to monitor for this SIB change (for example, when there are minor/frequent changes in network congestion information), while using an updated tag value can be employed when major congestion events occur. In this way, the eNB can selectively advertise the SIB17 change, with an updated tag value, when a major network congestion change occurs, which may happen less frequently.

Certain embodiments relate to an apparatus including means for detecting at least one Wi-Fi advertised value being advertised over a cellular system information block message. The apparatus may also include means for extracting, from the at least one Wi-Fi advertised value being advertised over a cellular system information block message, at least one cellular network insight indicating guidance UEs performing network access.

There may be various ways of providing further guidance to UEs on how to perform access in response to the SIB payload described. The following are some examples. In certain embodiments, the guidance may indicate a randomization interval, across which the subscriber device is to randomly select a time in which to initiate its connection to the network. In certain embodiments, this guidance may indicate a particular policy with which the subscriber device should further select an access code, for use when performing randomized access/RACH. Furthermore, in certain embodiments this guidance may indicate a particular RACH region, where the subscriber device is to perform random access.

For example, each time the eNB transmits an indication over the knowledge sharing protocol to a UE, indicating low congestion, there can be a probability that one or more UEs will, in response, initiate a transfer. Consequently, the network/eNB congestion estimate may also be incrementally adjusted in response to the number of network/eNB initiated low congestion indications recently transmitted. In certain embodiments, the signaling can indicate a random back off congestion interval duration, in order to randomize the timing of the UE access attempts in response to a low congestion notification.

In certain further embodiments, the value may convey to the UEs the value of a timer, indicating how long the network was congested, prior to advertising its current low congestion interval. In such embodiments, the UE can then use the value of this timer to determine the likelihood of other subscriber devices simultaneously attempting access in response to the low congestion indication. If the timer value is longer, the subscriber device may conclude that a larger number of other subscribers are likely to be simultaneously performing access, because other subscriber devices were potentially accumulated over a longer time interval, while waiting for a low congestion interval.

There may be various way to use non-cellular signaling being tunneled through cellular signaling, to indicate support for a proprietary protocol over the cellular system. The following are some examples. For example, certain embodiments relate to an apparatus including means for detecting at least one Wi-Fi advertised value being advertised over a cellular system information block message. The apparatus may also include means for extracting, from the at least one Wi-Fi advertised value being advertised over a cellular system information block message, at least one cellular network insight indicating support for a particular proprietary protocol.

In certain further embodiments, the cellular network insight may utilize the system information block broadcast mechanism described to convey a unicast-like messaging directed to a single UE, for example using a field based on the UE TIMSI to indicate when and/or how that UE should connect to the network. In certain embodiments, the cellular network insight may convey broadcast messaging directed to a group of UE, for example indicating to one or more of the connected UEs and the idle UEs, the current network congestion state.

In certain embodiments, a proprietary protocol employed may be one where the subscriber device is permitted to transmit specific UL knowledge sharing messages on the uplink over MAC control element (CE) using previously reserved index values.

There are multiple embodiments as to how the UE can determine that the UE can begin using the knowledge sharing protocol. The following are several examples. In certain embodiments, when the UE receives a downlink knowledge sharing protocol message over the BSSID and SIB 17, the UE may then be allowed to utilize the knowledge sharing proprietary protocol, possibly including transmitting uplink knowledge sharing protocol messaging.

In certain embodiments, the Wi-Fi BSSID information could potentially be used to advertise LTE network/eNB support for the network knowledge sharing protocol. In another embodiment, the first subscriber may determine that the cell supports the knowledge sharing protocol by observing certain non-cellular signaling, for example over Wi-Fi and/or Bluetooth, which signaling can be tunneled through cellular network/eNB signaling. For example, this non-cellular information is being indicated through the cellular SIB (system information block) signaling such as SIB 17. The system may further use encrypted Wi-Fi and or Bluetooth identifiers in order to further authenticate to the UE that the knowledge sharing protocol is supported by that cell.

There may be various way for downlink knowledge sharing insights to be conveyed over the non-cellular signaling information being transmitted through the LTE SIB signaling such as the within the BSSID SIB 17. For example, the downlink knowledge sharing messaging can include one or more specific information elements, as described above.

Subscriber processing of downlink knowledge sharing messaging can occur in various ways, of which the following are some examples. Downlink knowledge sharing indications may enable the UE to determine whether now is a relatively good time to initiate and/or continue with and/or stop an application transfer exchange with the network/eNB. The UE can combine its knowledge of the transfer attributes with those of the network/eNB congestion, for example with attributes such as the network/eNB congestion timescale provided, to determine whether to, and when to initiate any transfer.

Downlink notification of inactivity timer can occur in various ways, of which the following are some examples. The UE may use a received indication of the RRC or idle inactivity timer value currently planned to be used by the network/eNB for that UE, in order to minimize the amount of additional signaling required in order for the UE to avoid transitioning to idle. For example the UE can then wait until just prior to the inactivity timer expiration before initiating bearer traffic necessary to maintain the subscribers connected state, such that the UE can continue to wait for a knowledge sharing low congestion notification without necessarily having to transmit uplink knowledge sharing messaging to the eNB, requesting an explicit extension to the RRC inactivity timer.

Additionally when the knowledge sharing protocol performs a downlink congestion notification to the UE using this knowledge sharing protocol, the eNB can additionally indicate that the network/eNB is congested and there is also a particularly large density of subscribers supporting knowledge sharing, and/or from a particular device vendor, such as Apple Corp., within that cell. Certain embodiments may thus address a case in which each device from a particular manufacturer or vendor may be more motivated to back off its transfer if there are other devices, from the same vendor or manufacturer, in that cell.

Sensitivity of subscriber throughput or effective congestion level can be provided as a function of signal strength. Thus, in certain embodiments, the parameter that eNB provides with this knowledge sharing can be a parameter that would enable the UE to estimate the multiplicative change in the likely throughput the UE would achieve, as the UE moves further away from the cell. Thus, the information can capture a degree to which the scheduler is biased towards providing higher data rates to the subscribers which are closer to the cell. For example, the information can reflect a multiplicative change in throughput as a function of RSRP, for example for a given congestion level.

In certain embodiments, the UE can use its anticipated mobility and anticipated signal strength to calculate the maximum signal strength interval where a transfer could occur. Furthermore, the UE can then determine the time of this maximum signal strength time interval.

The knowledge sharing message format can vary. For example, the knowledge sharing protocol may use one or more of the reserved indexes within the SIB 17.

UE processing of knowledge sharing messaging received can vary. The following are some examples of such processing. In response to receiving a knowledge sharing message, the UE may evaluate the urgency of the UE's transfer, and decide whether to start now, continue, or temporarily or significantly delay the transfer. The UE may act on the UE's own decision, for example with respect to initiating transfer.

In certain embodiments, the UE may use the information received over knowledge sharing to determine whether or not to utilize an alternative wireless technology such as Wi-Fi. For example, if the knowledge sharing protocol indicates that the eNB is relatively uncongested, then the UE may determine that the UE can save battery life by connecting over the eNB. In contrast if the knowledge sharing protocol indicates that the eNB is relatively congested, then the UE may connect through the Wi-Fi access point, for example the un-trusted Wi-Fi access point within the subscriber's home.

In certain embodiments, the network may indicate over the knowledge sharing protocol whether the UE should utilize a Wi-Fi access point, as opposed to cellular. Although Wi-Fi is presented as one alternative to cellular, other non-cellular access technologies are also permitted.

In certain embodiments, the eNB can estimate the likelihood that the congestion on a link will improve by comparing the shorter-term congestion over time window, for example W in duration, with the congestion over a longer time window, such as 4*W. If the congestion in the longer time window is lower than in the short duration, then the eNB may further utilize this as a factor in determining that the congestion is likely to improve. Additionally, if the congestion over each of the previous four consecutive windows have progressively lower congestion, then the eNB may further utilize this as a factor in determining that the congestion is more likely to improve.

Certain embodiments relate to a method in which the UE cannot transmit a knowledge sharing message unless the UE has received a knowledge sharing message over SIB 17 from the eNB.

Furthermore, certain embodiments relate to a method in which the eNB can additionally simultaneously use SIB17 to provide SSID/non-cellular guidance to UEs, by utilizing the ability for the eNB to indicate up to 16 different WLAN-IDS. The cellular networking insight may occupy only a subset, and possibly a single WLAN ID, for example "max-WLAN-Id-r12 INTEGER::=16" from 3GPP TS 36.331.

Certain embodiments may have various benefits and/or advantages. For example, certain embodiments may enable very early exchange of information, while minimizing overhead, and avoiding compatibility problems with the existing LTE standard. Additionally certain embodiments may enable interworking without impacting the operating system.

Additionally, by tunneling such a protocol over LTE, certain embodiments can convey the network assistance data that is available over the entire cellular coverage area. In contrast, with the direct usage of Wi-Fi SSID, the network assistance data may then only be available in a small subset of the geographic coverage area, for example near small cells with co-located Wi-Fi capability.

Utilizing the LTE modem API to enable applications to obtain and abstract this information without the need to modify the UE operating system may enable deployment of this technique without the need to involve the operating system manufacturers or vendors.

FIG. 6 illustrates a method according to certain embodiments. As shown in FIG. 6, a method can include, at 610, detecting, by a device, at least one advertised value of non-cellular access, wherein the at least one advertised value is received by the device over a cellular system information block message. The method can also include, at 620, extracting, from the at least one advertised value, at least one cellular network insight for a cellular network condition.

The detecting can be performed by an application on the device. The device can be a user equipment, such as any smart phone, personal digital assistant, tablet, wearable computer, smart watch, personal computer, laptop computer, or other digital accessory provided with communications hardware. The non-cellular access can be Wi-Fi or any other alternative to cellular radio access.

Extracting the cellular networking insight from the advertised value can include extracting the cellular system information from a SIB 17 message, verifying the vendor specific attributes within the basic service set identifier matches a predetermined value, or a combination thereof.

The at least one advertised value can be a Wi-Fi service identifier, comprising at least one of a basic service set identifier, service set identifier, or a homogenous extended service set identifier. The basic service set identifier value can include redundancy such that the basic service set identifier value is signed and verified by an application running on the device. As mentioned above, this redundancy may help to assist in verification and/or authentication.

Rules for the extracting of the cellular network insight from the at least one advertised value can be pre-provisioned onto the device, can be downloaded from at least one of an internet server or third generation partnership project (3GPP) signaling, or can be obtained using some combination of those or other techniques.

Rules for the extracting of the cellular network insight from the at least one advertised value can be a function of other parameters. The other parameters may, for example, include current cell identifier number, time of day, location, encryption key, a seed, or any combination thereof.

The method can also include, at 630, using the extracted at least one cellular network insight to cause at least one application adaptation, to provide the at least one cellular network insight to at least one other application running on the device or tethered to the device, or both to cause an adaptation in an application or component of the device and to notify another application or component of the device about the network information.

The cellular network condition encoded in the at least one cellular network insight can include one or a plurality of cellular communication links. In certain instances, the cellular network insight can include a geographic region that is broader than the coverage area of the non-cellular access. As mentioned above, the insight can be provided based on knowledge unavailable to access nodes of the non-cellular access technology, but known to the cellular network.

The cellular network condition encoded in the at least one cellular network insight can convey that the condition corresponds to at least one specific cellular network access point and that the condition conveys at least one of a cellular access point congestion condition or an expected cellular network throughput condition. In certain embodiments, both throughput and congestion can be indicated.

The cellular network condition encoded in the at least one cellular network insight can convey an authentication challenge value for management of a specific cellular network access point.

The method can also include, at 640, detecting a first level of network congestion on a cellular network. The method can further include, in response to the detecting of the first level of network congestion, at 650 transmitting a non-cellular identifier related to non-cellular access. The non-cellular identifier can include a basic service set identifier value over the cellular network. The basic service set identifier value can encode the first level of network congestion on the cellular network.

The method can also include, at 660, detecting a second level of network congestion on the cellular network. The method can further include, in response to the detecting of the second level of network congestion, at 670 transmitting a second basic service set identifier value over the cellular network, wherein the second basic service set identifier value encodes the second level of network congestion. The detecting the first level, the detecting the second level, or both, can be performed by an access node. The access node can be an access point, a base station, an evolved Node B, or other access network element. The non-cellular access can be any alternative to cellular access, such as Wi-Fi.

The cellular network congestion information can be appended to a reserved vendor specific attribute, which can then be further conveyed over the basic service set identifier value.

At least one signal strength threshold can be advertised over the cellular system. The signal strength threshold can instruct subscriber devices to substantially ignore the basic service set identifier value. This instruction can further include the following: setting the low signal strength threshold to be higher than the high signal strength threshold; setting both the low and high signal strength threshold to have the highest possible value; or setting both the low and high signal strength threshold to have the lowest possible value.

Furthermore, certain embodiments relate to a method in which the eNB can use SIB17 to provide WLAN offload guidance to UEs (as per the current LTE standard) while simultaneously enabling various embodiments described herein. One such embodiment involves utilizing an additional PLMN. A first WLAN-OffloadConfig can then be provided for a first PLMN for use in providing WLAN-OffloadConfig guidance to UEs, as per the current LTE standard. A second WLAN-OffloadConfig can be provided for the second PLMN as described, thereby enabling various embodiments described herein. In another embodiment, a subscriber device receiving WLAN-OffloadConfig indicating that the low signal strength threshold to be higher than the high signal strength threshold, will utilize proprietary knowledge to reverse the high and low signal strength thresholds, as a part of the proprietary protocol design. Furthermore it may use the observation that the low signal strength threshold is higher than the high signal strength threshold, to determine that the proprietary protocol is in use. In another embodiment, one or more portions of the correct WLAN-OffloadConfig information may be conveyed within the WLAN ID list, such as within the last two octets of the BSSID.

The method can further include, at 680, determining whether to change an advertised tag value which is advertised over the cellular system, wherein this determination comprises at least one of comparing a previously advertised level of network congestion to the updated level of network congestion being advertised or comparing a time of a last tag value change with the current time. This determination can further include determining to change the tag value in response to at least one of determining that the change in the network congestion level is greater than a threshold or determining that the time subsequent to the last tag value change was greater than a threshold.

A change in the tag value can cause at least one subscriber device to additionally receive and decode additional system information block messages. Other actions can also be produced by such a change, as described above.

Figure 7:
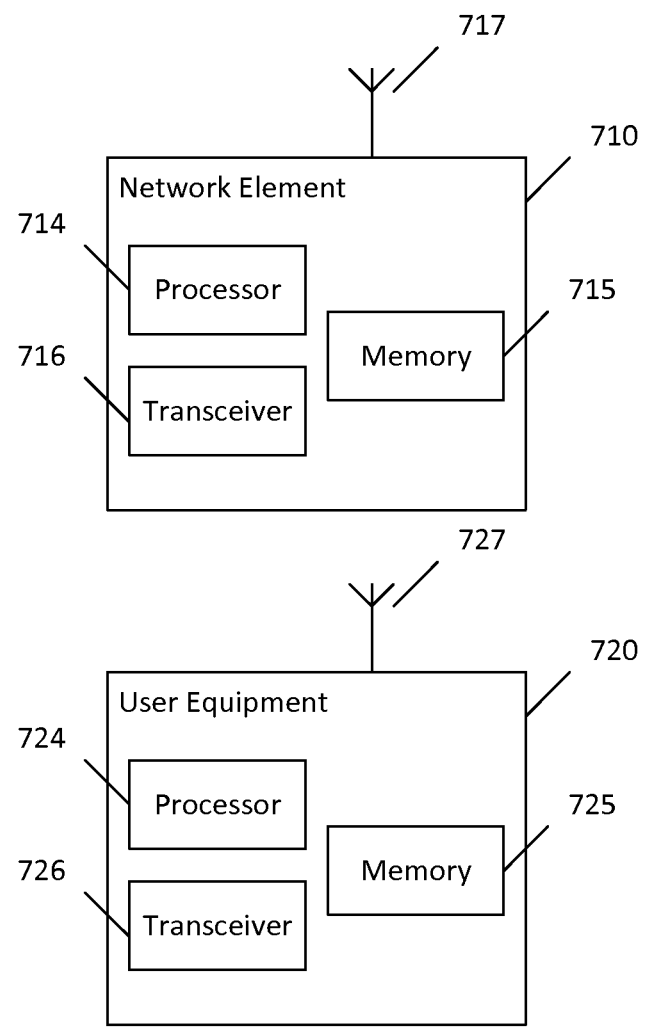
FIG. 7 illustrates a system according to certain embodiments.

FIG. 7 illustrates a system according to certain embodiments of the invention. It should be understood that each block of the flowchart of FIG. 6 may be implemented by various means or their combinations, such as hardware, software, firmware, one or more processors and/or circuitry. In one embodiment, a system may include several devices, such as, for example, network element 710 and user equipment (UE) or user device 720. The system may include more than one UE 720 and more than one network element 710, although only one of each is shown for the purposes of illustration. A network element can be an access point, a base station, an eNode B (eNB), or any other network element, such as any access node. Each of these devices may include at least one processor or control unit or module, respectively indicated as 714 and 724. At least one memory may be provided in each device, and indicated as 715 and 725, respectively. The memory may include computer program instructions or computer code contained therein, for example for carrying out the embodiments described above. One or more transceiver 716 and 726 may be provided, and each device may also include an antenna, respectively illustrated as 717 and 727. Although only one antenna each is shown, many antennas and multiple antenna elements may be provided to each of the devices. Other configurations of these devices, for example, may be provided. For example, network element 710 and UE 720 may be additionally configured for wired communication, in addition to wireless communication, and in such a case antennas 717 and 727 may illustrate any form of communication hardware, without being limited to merely an antenna.

Transceivers 716 and 726 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 720 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

The user device or user equipment 720 may be a sensor or smart meter, or other device that may usually be configured for a single location.

In an exemplifying embodiment, an apparatus, such as a node or user device, may include means for carrying out embodiments described above in relation to FIG. 6.

Processors 714 and 724 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 715 and 725 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 710 and/or UE 720, to perform any of the processes described above (see, for example, FIG. 6). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments of the invention may be performed entirely in hardware.

Furthermore, although FIG. 7 illustrates a system including a network element 710 and a UE 720, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   detecting, by a device, at least one advertised value of non-cellular access, wherein the at least one advertised value is received by the device over a cellular system information block message;
   wherein the at least one advertised value comprises a Wi-Fi service identifier comprising a basic service set identifier;
   wherein the basic service set identifier is a dedicated medium access control address value; and
   extracting, from the at least one advertised value, at least one cellular network insight for a cellular network condition;
   wherein extracting the cellular networking insight from the advertised value comprises at least one of extracting the cellular system information from a system information block 17 message; or verifying vendor specific attributes within the basic service set identifier matches a predetermined value;
   wherein the cellular network condition encoded in the at least one cellular network insight conveys an authentication challenge value for management of a specific cellular network access point.

2. The method according to claim 1, wherein the basic service set identifier value comprises redundancy such that the basic service set identifier value is signed and verified by an application running on the device.

3. The method of claim 1, wherein rules for the extracting of the cellular network insight from the at least one advertised value are pre-provisioned onto the device or are downloaded from at least one of an internet service or third generation partnership project signaling.

4. The method of claim 1, wherein rules for the extracting of the cellular network insight from the at least one advertised value are a function of other parameters comprising at least one of current cell identifier number, time of day, location, encryption key, or a seed.

5. The method of claim 1, further comprising using the extracted at least one cellular network insight to cause at least one application adaptation.

6. The method of claim 1, wherein the at least one advertised value conveys that the cellular network condition corresponds to at least one specific cellular network access point, and wherein the cellular network condition conveys at least one of a cellular access point congestion, or an expected cellular network throughput.

7. The method of claim 1, further comprising providing the at least one cellular network insight to an application running on the device.

8. The method of claim 1, further comprising providing the at least one cellular network insight to an application tethered to the device.

9. The method of claim 1, wherein the Wi-Fi service identifier comprises at least one of a service set identifier, or a homogenous extended service set identifier.

10. An apparatus, comprising:
    at least one processor; and
    at least one non-transitory memory including computer program code, wherein the at least one memory and computer program code are configured to, with the at least one processor, cause the apparatus at least to detect at least one advertised value of non-cellular access, wherein the at least one advertised value is received by the apparatus over a cellular system information block message wherein the at least one advertised value comprises a Wi-Fi service identifier comprising a basic service set identifier;

wherein the basic service set identifier is a dedicated medium access control address value; and extract, from the at least one advertised value, at least one cellular network insight for a cellular network condition by a process that comprises at least one of: extracting the cellular system information from a system information block 17 message; or verifying vendor specific attributes within the basic service set identifier matches a predetermined value;

wherein the cellular network condition encoded in the at least one cellular network insight conveys an authentication challenge value for management of a specific cellular network access point.

11. The apparatus of claim 10, wherein the Wi-Fi service identifier comprises at least one of a service set identifier, or a homogenous extended service set identifier.

12. The apparatus of claim 10, wherein the detection is performed by an application on the apparatus, wherein the apparatus comprises a user equipment, and wherein the non-cellular access comprises Wi-Fi.

13. The apparatus according to claim 10, wherein the basic service set identifier value comprises redundancy such that the basic service set identifier value is signed and verified by an application running on the apparatus.

14. The apparatus of claim 10, wherein rules for the extracting of the cellular network insight from the at least one advertised value are pre-provisioned onto the apparatus or are downloaded from at least one of an internet server or third generation partnership project (3GPP) signaling.

15. The apparatus of claim 10, wherein rules for the extracting of the cellular network insight from the at least one advertised value are a function of other parameters comprising at least one of current cell identifier number, time of day, location, encryption key, or a seed.

16. The apparatus of claim 10, wherein the at least one memory and computer program code are configured to, with the at least one processor, cause the apparatus at least to use the extracted at least one cellular network insight to cause at least one application adaptation.

17. The apparatus of claim 10, wherein the cellular network condition encoded in the at least one cellular network insight comprises a plurality of cellular communication links.

18. The apparatus of claim 10, wherein the at least one advertised value conveys that the cellular network condition corresponds to at least one specific cellular network access point, and wherein the cellular network condition conveys at least one of a cellular access point congestion, or an expected cellular network throughput.

19. The apparatus of claim 10, wherein the at least one memory and computer program code are configured to, with the at least one processor, cause the apparatus to provide the at least one cellular network insight to an application running on the device.

20. The apparatus of claim 1, wherein the at least one memory and computer program code are configured to, with the at least one processor, cause the apparatus to provide the at least one cellular network insight to an application tethered to the apparatus.

* * * * *